Figure 1:
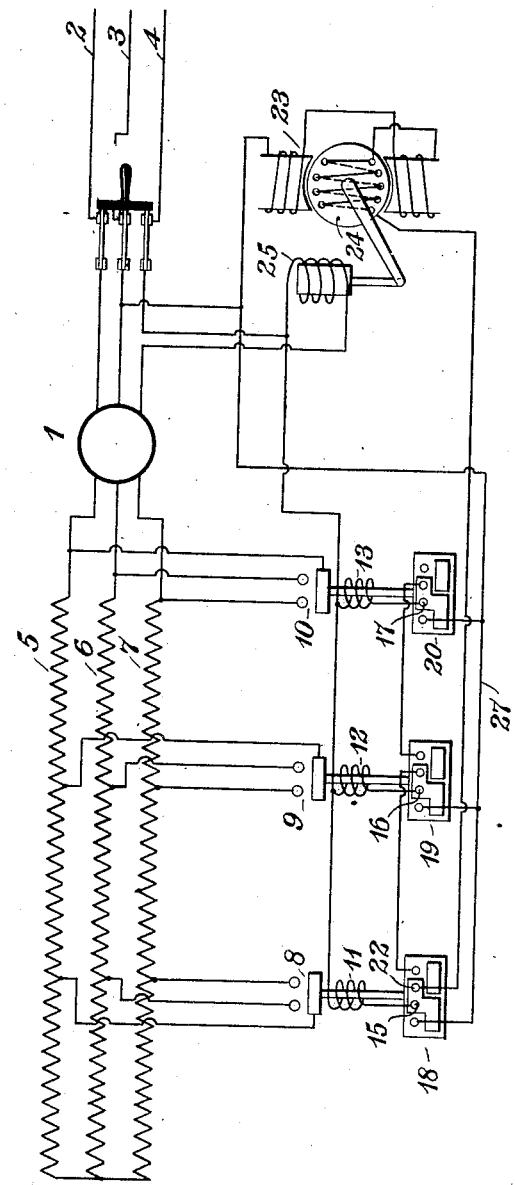

H. D. JAMES.
SYSTEM OF CONTROL.
APPLICATION FILED SEPT. 19, 1910.

1,078,622.

Patented Nov. 18, 1913.
2 SHEETS—SHEET 1.

WITNESSES:
C. L. Belcher
Otto S. Schairer

INVENTOR
Henry D. James
BY
Imley G. Carr
ATTORNEY

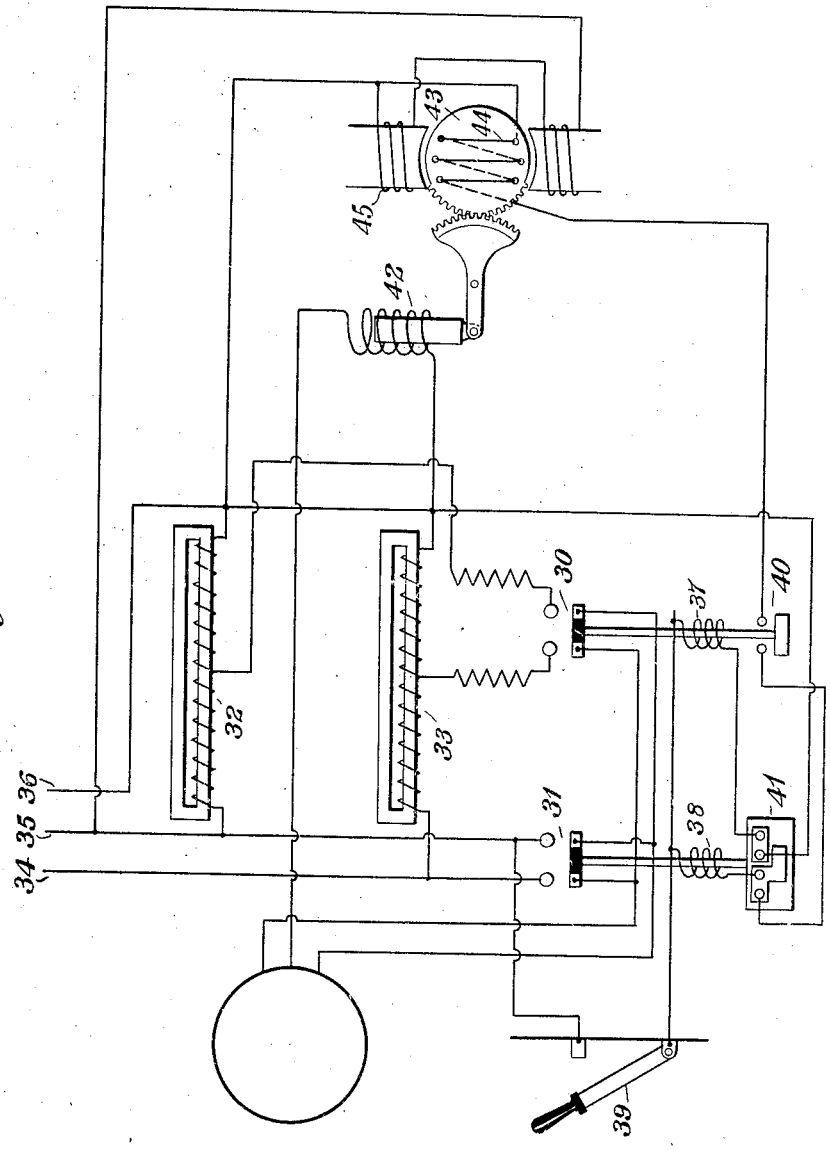

UNITED STATES PATENT OFFICE.

HENRY D. JAMES, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,078,622.

Specification of Letters Patent. Patented Nov. 18, 1913.

Application filed September 19, 1910. Serial No. 582,657.

*To all whom it may concern:*

Be it known that I, HENRY D. JAMES, a citizen of the United States, and a resident of Pittsburgh, in the county of Allegheny and State of Pennsylvania, have invented a new and useful Improvement in Systems of Control, of which the following is a specification.

My invention relates to electrical systems of control and particularly to systems for regulating the speeds of induction motors.

The object of my invention is to provide ample and effective means for automatically removing resistance from the secondary circuit of an alternating current induction motor, or for otherwise governing the operation of a motor of this type, in accordance with the amount of current supplied thereto.

Figure 1 of the accompanying drawing illustrates diagrammatically a system of control which embodies my invention, and Fig. 2 is a similar illustration of a modification of the system shown in Fig. 1.

The system comprises an induction motor 1, the primary member of which is connected to a suitable supply circuit 2, 3 and 4, and the secondary winding of which is connected in series with resistances 5, 6 and 7, to suitable points of subdivision of which the terminals of a plurality of separately actuated switches 8, 9 and 10 are respectively connected. The switches 8, 9 and 10 are actuated, or are governed in operation, by means of magnet windings or coils 11, 12 and 13, respectively, one terminal of each of which is connected to circuit conductor 4 and the other terminals of which are respectively connected to contact members 15, 16 and 17 of interlocking switches 18, 19 and 20 that are operated, respectively, by the switches 8, 9 and 10. Contact terminal 22, of the interlocking switch 18, is connected to one terminal of a voltage-generating device 23, the other terminal of which is connected to circuit conductor 3, the voltage-generating device being thus normally included in series circuit with the coil 11 of the switch 8. As here shown, the voltage-generating device is an induction regulator having relatively movable members, the member 24 of which is adapted to be operated by an electro-magnet having a winding 25 connected in series with circuit conductor 4, or otherwise supplied with current which is proportional, in amount, to that which traverses the said conductor. The member 24 normally occupies the position shown, so that under this condition the regulator has no effect upon the voltage which is applied to the coil 11. However, when the current which traverses the conductor 4 exceeds a predetermined amount, the member 24 is rotated in a clockwise direction, and the induction regulator is thereby caused to produce a voltage in opposition to that which is applied to the coil 11 from the circuit conductors 3 and 4.

The interlocking switches 18, 19 and 20 are so constructed that, as the corresponding switches are closed, the coils 11, 12 and 13 thereof are transferred from the actuating circuit, which includes the voltage regulator, to another or retaining circuit, including conductor 27 that is connected to circuit conductor 3. When the switch 11 is closed, the interlocking switch 18 also serves to connect the winding 12 of the switch 9 in circuit with the voltage regulator, and when the switch 9 is closed, interlocking switch 19 serves to connect the winding 13 of the switch 10 in circuit with the voltage regulator.

When the primary winding of the motor 1 is connected to the circuit 2, 3 and 4, there is a rush of current which passes through the coil 25 and causes movement of the member 24 of the voltage regulator in a clockwise direction. Although a circuit is then complete through the coil 11, by way of parts 4, 11, 15, 18, 23 and 3, the said coil will not be sufficiently energized to effect operation of the switch 8, because the voltage regulator produces a voltage in opposition to that which is applied to the coil 11 from the circuit 3—4. However, as the speed of the motor 1 increases, the current supplied to it through the conductor 4 diminishes, and, when diminished to less than a predetermined amount, the movable member 24 of the regulator returns to its normal position, wherein it opposes no voltage to the voltage supplied from the circuit 3—4 to the coil 11. The coil 11 then closes the switch 8 and also operates the interlocking switch 18.

Switch 8, when closed, short-circuits parts of the resistances 5, 6 and 7 and thus causes an increase of current in the motor windings. The increase of current in the conductor 4 and in the coil 25 again causes rotation of the member 24 of the voltage regulator in a clockwise direction, and the voltage of the regulator then opposes that of the circuit 3—4. Upon raising the interlocking switch 18, the voltage regulator 23 is removed from the circuit of the coil 11, and is connected in circuit with the coil 12 of the switch 9, and the coil 11 is connected to the conductor 27. When the current supplied to the motor again diminishes, the movable member of the voltage regulator returns to its normal position, in which the regulator does not oppose the voltage of the circuit 3—4. The winding 12 of the switch 9 then becomes sufficiently energized to close the switch 9 and thus establish circuits similar to those which were established by closing the switch 8.

The operation of the system continues as above set forth until all of the switches have been closed and the resistances 5, 6 and 7 have been completely short-circuited. Any desired number of switches may be employed, and the structural details and arrangement of the parts and their connections may be considerably modified from what have been shown, without departing from the spirit of the invention.

The invention may also be employed in other relations than that illustrated by Fig. 1, as, for instance, for governing the voltage applied to a motor, as shown in Fig. 2, in which multiple-pole switches 30 and 31 are employed for connecting the primary member of an induction motor either to suitable intermediate points of transformers 32 and 33, that are connected to supply circuit 34—35—36, or directly to said circuit. The said switches are operated, or are governed in their operation, by means of magnet windings 37 and 38, respectively, the circuits of which are controlled primarily by a manually operated master switch 39 and secondarily by interlocking switches 40 and 41 that are operated, respectively, by the main switches 30 and 31. In series circuit with one of the primary conductors to the motor is a magnet coil 42 for actuating the movable member 43 of an induction regulator, the winding 44 upon which is included in circuit with magnet winding 38 when switches 30 and 40 are closed. The primary winding 45 of the regulator is connected between main circuit conductors 35 and 36.

When master switch 39 is closed, a circuit is established through magnet winding 37, by way of parts bearing reference numerals 35, 39, 37, 41 and 36, and switch 30 closes and connects two of the terminals of the primary winding of the motor to intermediate points of the transformers 32 and 33. The interlocking switch 40 also closes and establishes the circuit of magnet winding 38, by way of parts bearing reference numerals 35, 39, 38, 41, 40, 44 and 36. However, if the current traversing the coil 42 exceeds a predetermined amount, the movable member 43 of the induction regulator will occupy a position such that the regulator voltage will oppose that applied to the winding 38 from the circuit 35—36, and the said winding will not become sufficiently energized to close the switch 31 until the current traversing the coil 42 has fallen to less than the predetermined amount, whereupon the movable member 43 of the regulator assumes its normal position and no longer opposes the voltage of the circuit 35—36. The switch 31 then closes and connects the primary winding of the motor directly to the circuit 34—35—36. When the switch 31 closes, the interlocking switch 41 interrupts the circuit of the winding 37, so that the switch 30 will open, and connects the winding 38 directly to the conductor 36 without the intervention of the winding 44 of the induction regulator.

I claim as my invention:

1. A system of control comprising a circuit, a plurality of separately actuated switches, coils governing the operation thereof, interlocking switches actuated by the aforesaid switches and severally controlling the circuits of the coils of the next succeeding switches, a voltage-generating device in series with the said coils, and means actuated in response to variations in the current traversing said circuit for governing the operation of the voltage-generating device.

2. A system of control comprising a circuit, a plurality of separately actuated switches, coils governing the operation thereof, interlocking switches actuated by the aforesaid switches and severally controlling the circuits of the coils of the next succeeding switches, a voltage-generating device in series with the said coils, and means for causing the voltage-generating device to diminish the voltage applied to the said coils when the current traversing the said circuit exceeds a predetermined amount.

3. A system of control comprising a main circuit, a plurality of separately actuated switches, coils governing the operation thereof, means for applying a voltage to the circuit of said coils, a voltage-generating device in series with the coils, and means for causing the voltage-generating device to apply a counter voltage to the circuit of said coils when the current traversing the main circuit exceeds a predetermined amount.

4. A system of control comprising a main circuit, a plurality of separately actuated switches, coils governing the operation thereof, means for applying a voltage to the circuit of said coils, and means for applying an opposing voltage to the circuit of said coils when the current traversing the main circuit exceeds a predetermined amount.

5. A system of control comprising a main circuit, a plurality of separately actuated switches, coils governing the operation thereof, an actuating and a retaining circuit therefor, a voltage-generating device in series with the actuating circuit, and means for causing the voltage generator to oppose the voltage of the actuating circuit when the current traversing the main circuit exceeds a predetermined amount.

6. A system of control comprising a circuit, a plurality of separately actuated switches, coils governing the operation thereof, a voltage-generating device in series with the said coils, and means actuated in response to variations in the current traversing said circuit for governing the operation of the voltage-generating device.

7. A system of control comprising a circuit, a plurality of separately actuated switches, coils governing the operation thereof, a voltage-generating device in series with the said coils, and means for causing the voltage-generating device to diminish the voltage applied to the said coils when the current traversing the said circuit exceeds a predetermined amount.

8. A system of control comprising a main circuit, a plurality of separately actuated switches, coils governing the operation thereof, an actuating and a retaining circuit therefor, a voltage-generating device associated with the actuating circuit, and means for causing the voltage generator to oppose the voltage of the actuating circuit when the current traversing the main circuit exceeds a predetermined amount.

9. A system of control comprising a circuit, a plurality of separately actuated switches, coils governing the operation thereof, a voltage-generating device associated with said coils, and means actuated in response to variations in the current traversing said circuit for governing the operation of the voltage-generating device.

In testimony whereof, I have hereunto subscribed my name this 12th day of Sept., 1910.

HENRY D. JAMES.

Witnesses:
FRED C. HANKER,
B. B. HINES,

---

Copies of this patent may be obtained for five cents each, by addressing the "Commissioner of Patents, Washington, D. C."